US008225103B2

(12) United States Patent
Chiou et al.

(10) Patent No.: US 8,225,103 B2
(45) Date of Patent: Jul. 17, 2012

(54) CONTROLLING ACCESS TO A PROTECTED NETWORK

(75) Inventors: Scott L. Chiou, San Mateo, CA (US);
Nelson A. Cicchitto, San Ramon, CA (US)

(73) Assignee: Avatier Corporation, San Ramon, CA (US)

( * ) Notice: Subject to any disclaimer, the term of this patent is extended or adjusted under 35 U.S.C. 154(b) by 1089 days.

(21) Appl. No.: 11/552,313

(22) Filed: Oct. 24, 2006

(65) Prior Publication Data

US 2008/0098461 A1    Apr. 24, 2008

(51) Int. Cl.
| H04L 9/32 | (2006.01) |
| H04L 29/06 | (2006.01) |
| G06F 21/00 | (2006.01) |
| G10L 17/00 | (2006.01) |

(52) U.S. Cl. .............. 713/186; 726/6; 726/28; 709/225; 704/273

(58) Field of Classification Search ................... 726/3–5, 726/7, 26–29, 6, 9; 713/168, 182, 185, 186; 709/217, 219, 229, 225; 705/51; 707/1, 707/9, 10; 704/273, 246

See application file for complete search history.

(56) References Cited

U.S. PATENT DOCUMENTS

| 5,315,636 | A | * | 5/1994 | Patel ........................ 379/201.07 |
| 5,384,831 | A | * | 1/1995 | Creswell et al. ......... 379/114.05 |
| 5,550,907 | A | * | 8/1996 | Carlsen .................... 379/211.02 |
| 5,636,282 | A | * | 6/1997 | Holmquist et al. ............. 726/16 |
| 6,065,120 | A | * | 5/2000 | Laursen et al. .................... 726/5 |
| 6,606,543 | B1 | * | 8/2003 | Sproule et al. ..................... 701/1 |
| 6,871,287 | B1 | * | 3/2005 | Ellingson .......................... 726/9 |
| 6,934,858 | B2 | * | 8/2005 | Woodhill .......................... 726/5 |
| 6,993,658 | B1 | * | 1/2006 | Engberg et al. ............... 713/185 |
| 7,054,819 | B1 |   | 5/2006 | Loveland |
| 7,577,847 | B2 | * | 8/2009 | Nguyen et al. ................ 713/186 |
| 2003/0046083 | A1 |   | 3/2003 | Devinney, Jr. et al. |
| 2005/0231760 | A1 | * | 10/2005 | Minato ........................ 358/1.15 |
| 2005/0268107 | A1 |   | 12/2005 | Harris et al. |
| 2006/0041755 | A1 |   | 2/2006 | Pemmaraju |

FOREIGN PATENT DOCUMENTS

| EP | 0444351 | 4/1991 |
| WO | WO2005114904 | 12/2005 |

* cited by examiner

*Primary Examiner* — Zachary A Davis
(74) *Attorney, Agent, or Firm* — Michael A. Glenn; Glenn Patent Group

(57) ABSTRACT

A system for controlling access to a protected network includes a network access control module that is coupled to the protected network and which is configured to restrict access to the network to an authorized user through a computer coupled to the protected network. The system also includes a communication device associated with the computer. The communication device automatically transmits a unique identifier corresponding to the communication device to the network access control module when a user uses the communication device to request access to the protected network via the computer. When the network access control module receives the unique identifier, the network access control module is configured to authenticate the communication device based on the unique identifier, to authenticate the user via the communication device when the communication device is authenticated, and when the user is authenticated, to submit log-on information directly to a log-on interface of the computer associated with the communication device so that the user can access the protected network via the computer.

24 Claims, 4 Drawing Sheets

CONTROLLING ACCESS TO A PROTECTED NETWORK

FIELD OF INVENTION

The present invention relates to enterprise networks, and more particularly to controlling access to a protected enterprise network by authenticating an authorized user via voice biometrics.

BACKGROUND

Many modern enterprises utilize one or more private or protected networks that allow workers to communicate with one another, to access shared information, and to perform every day tasks and functions. In most cases, the private network includes or provides access to sensitive and confidential information. For this and other reasons, the private network is typically restricted to authorized users, such as members of the enterprise.

Traditionally, an authorized user gains access to a protected network by submitting a credential that authenticates the user to the network. The credential is usually a username and password. The username/password credential, however, sometimes offers little security. For instance, because the username is typically some form of the user's name, it can easily be discovered by a malicious user. Moreover, when the password is created by the user, the user typically chooses a phrase that is easily discovered, e.g., the user's birthday, user's child's name. Once the username and password are misappropriated, i.e., stolen, the protected network can be vulnerable to attack.

To address these concerns, biometric features of the user are now being used in lieu of, or in addition to, the username/password credential. Exemplary biometric features include those features that uniquely identify an individual such as a fingerprint and retinal pattern. Other identifying biometric features are voice and speech patterns, which are particularly useful because a voice response can authenticate a user on two levels. For example, if the voice response is an answer to a challenge question, it can be used to authenticate the user based on a voiceprint and based on the response content. Thus, a person impersonating an authorized user would be required to imitate the authorized user's voiceprint and would be required to answer the challenge question correctly.

To implement voice authentication, the requesting user is typically prompted to submit a voice response via a microphone in a computer through which the user is seeking access to the network. The voice response should be of a quality such that an authentication application/module can accurately match the voice response to a stored sample corresponding to the user. This is problematic, however, because the quality and/or performance of a computer's microphone can vary from computer to computer within an enterprise where many different computer models and makes are used. To accommodate this, the matching algorithm can be designed to lower the matching criteria. This approach, however, can compromise security.

SUMMARY OF THE INVENTION

According to one aspect, a system for controlling access to a protected network includes a network access control module that is coupled to the protected network and which is configured to restrict access to the network to an authorized user through a computer coupled to the protected network. The system also includes a communication device associated with the computer. The communication device automatically transmits a unique identifier corresponding to the communication device to the network access control module when a user uses the communication device to request access to the protected network via the computer. When the network access control module receives the unique identifier, the network access control module is configured to authenticate the communication device based on the unique identifier, to authenticate the user via the communication device when the communication device is authenticated, and when the user is authenticated, to submit log-on information directly to a log-on interface of the computer associated with the communication device so that the user can access the protected network via the computer.

According to another aspect, a method for controlling access to a protected network includes receiving by a network access control module coupled to the protected network a unique identifier corresponding to a communication device associated with a computer when a user uses the communication device to request access to the protected network. The method further includes using the unique identifier to authenticate the communication device, authenticating the user via the communication device when the communication device is authenticated, and when the user is authenticated, submitting log-on information directly to a log-on interface of the computer associated with the communication device so that the user can access the protected network via the computer.

According to another aspect, a server includes a network access module configured to restrict access to the protected network to an authorized user, a data store communicatively coupled to the network access control module for storing information comprising authentication information and log-on information of a computer coupled to a protected network, and a communication interface communicatively coupled to the network access control module. The communication interface is configured to receive over a first secure communication channel a unique identifier corresponding to a separate communication device associated with the computer when a user uses the communication device to request access to the protected network. When the network access control module receives the unique identifier via the communication interface, the network access control module is configured to authenticate the communication device based on the unique identifier, to authenticate the user via the communication device over the first secure communication channel when the communication device is authenticated, and when the user is authenticated, to transmit over a second secure communication channel log-on information to a log-on interface of the computer associated with the communication device so that the user can access the protected network via the computer.

DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

Various aspects will now be described in connection with exemplary embodiments, including certain aspects described in terms of sequences of actions that can be performed by elements of a computing device or system. For example, it will be recognized that in each of the embodiments, at least some of the various actions can be performed by specialized circuits or circuitry (e.g., discrete and/or integrated logic gates interconnected to perform a specialized function), by program instructions being executed by one or more processors, or by a combination of both. Thus, the various aspects can be embodied in many different forms, and all such forms are contemplated to be within the scope of what is described.

Figure 1:
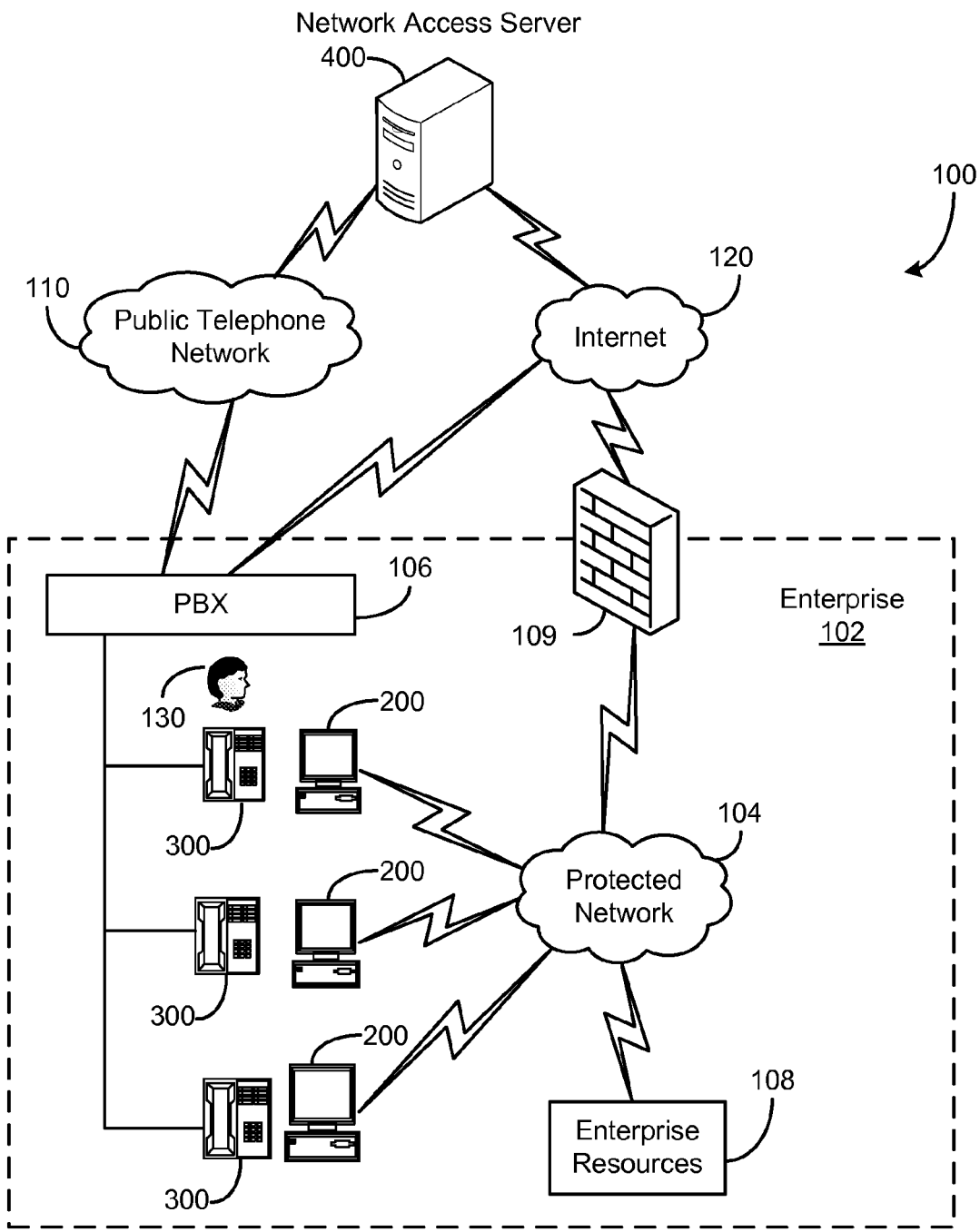
FIG. 1 is a block diagram of an exemplary system for controlling access to a protected network according to one embodiment.

FIG. 1 is a block diagram of an exemplary system 100 for controlling access to a protected network according to one embodiment. According to an exemplary embodiment, an enterprise 102 includes a private or protected network 104 that communicatively couples members of the enterprise 102 to one another and to enterprise resources 108 through a plurality of computer devices 200. The computer devices 200 can be, for example, work stations, laptop computers coupled to docking stations, personal computers, servers, client terminals and other similar devices that enable users 130 to access the protected network 104.

Figure 2:
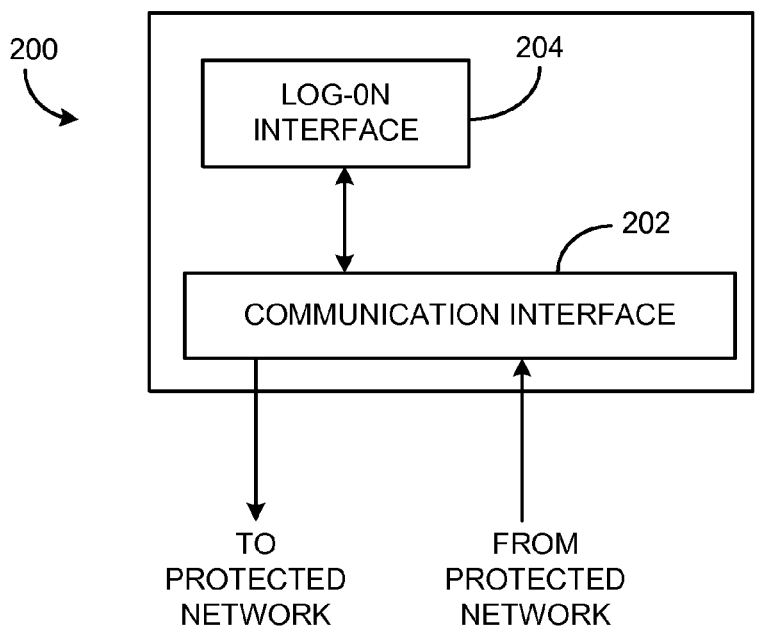
FIG. 2 is a block diagram of an exemplary computer coupled to the protected network according to one embodiment.

FIG. 2 is a block diagram of an exemplary computer device 200 according to one embodiment. The computer 200 includes a communication interface 202 that allows an authorized user 130 to send and receive data to and from the protected network 104. In one embodiment, a log-on interface 204 is communicatively coupled to the communication interface 202. The log-on interface 204, in one embodiment, can be an operating system independent application that is configured to receive and process log-on information to determine whether a user 130 should be allowed to use the computer 200 to access the protected network 104. For example, the log-on interface 204 can be a module that replaces an operation system dependent log-on module such as a graphical identification and authentication (GINA) application. In another embodiment, the log-on interface 204 can be a GINA module that is modified to support the system and method described herein. In an exemplary embodiment, the log-on interface 204 is configured to send and receive information to and from a web server, i.e., the interface 204 is a web-service enabled identification and authentication module, such that the log-on process can be facilitated via a web service.

In one embodiment, computer device 200 can be physically located at an enterprise facility, e.g., an office building or site, as shown in FIG. 1, where it is available to one or more authorized users 130. In another embodiment, the computer device 200 can be physically remote from the enterprise 102.

Referring again to FIG. 1, the protected network 104 is communicatively coupled to an external network, such as the Internet 120, so that users 130 can access resources outside of the enterprise 102. At least one firewall 109 protects the private network 104 in a known manner from unauthorized access from the external network 120.

According to one embodiment, each enterprise computer 200 is associated with a communication device 300. In an exemplary embodiment, the communication device 300 is a telephone that is communicatively coupled to a private branch exchange (PBX) hub 106. The PBX hub 106 is well known in the art and supports connections between the communication devices 300 within the enterprise 102 as well as connections from a telephone 300 to another device outside of the enterprise 102 via a public telephone network 110 or via the external network 120.

Figure 3:
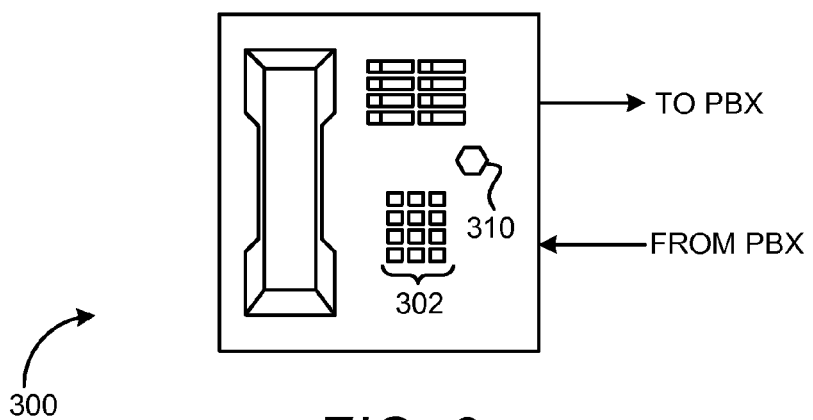
FIG. 3 is a block diagram of an exemplary communication device according to one embodiment.

FIG. 3 is a block diagram of an exemplary communication device 300 according to one embodiment. As is shown, the communication device 300 is a telephone that includes a means, e.g., a handset 304 or an internal microphone, for allowing the user 130 to transmit and receive voice data, and a standard keypad 302 that allows the user 130 to submit key data, e.g., to select an extension or to enter a number of another telephone 300. The communication device 300 includes a PBX interface (not shown) that is configured to transmit and receive key data and voice information from the PBX hub 106.

In one exemplary embodiment, the communication device 300 is used by a user 130 to request access to the protected network 104. In one embodiment, the communication device 300 can include a dedicated log-on button 310. The dedicated log-on button 310, which in one embodiment is separate from the keypad 302, is programmed to facilitate a log-on process for the computer 200 associated with the communication device 300. In this embodiment, the user 130 can initiate the log-on process in order to gain access to the protected network 104 via the computer 200 simply by activating, e.g., pressing, the dedicated log-on button 310. In another embodiment, one of the keys of the keypad 302, or a combination of keys in the keypad 302, can be programmed to initiate the log-on process. For example, a particular key in the keypad 302 can be programmed to start the log-on process when it is pressed a predetermined number of times. A more detailed discussion of the log-on process will be provided below.

Referring again to the exemplary embodiment illustrated in FIG. 1, the enterprise 102 is communicatively coupled to a network access server 400 via the external network 120, such as the Internet, and via the telephone network 110. The network access server 400 is a secure server that is configured to control access to the enterprise's protected network 104 via the enterprise computers 200.

Figure 4:
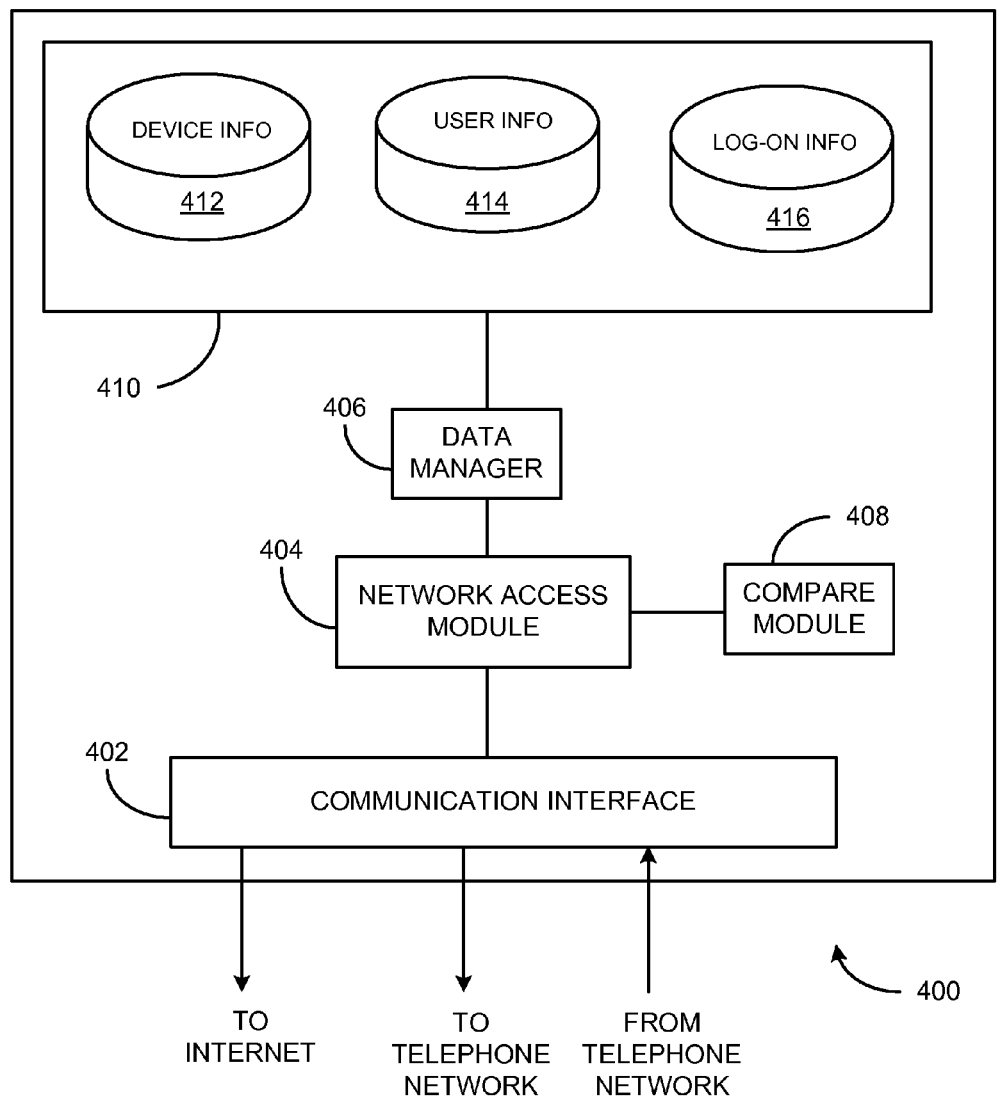
FIG. 4 is a block diagram of an exemplary network access server according to one embodiment.

FIG. 4 is a block diagram of an exemplary network access server 400 according to one embodiment. The network access server 400 includes a means for sending and receiving information to and from the internet 120 and to and from the telephone network 110 using well known communication protocols. For example, the network access server 400 can include a communication interface 402 that is configured to send and receive information to and from the internet 120 and to and from the telephone network 110 using well known communication protocols. In one embodiment, the communication interface 402 can include well known software and hardware components that support both data and telephony connections. In one exemplary embodiment, the communication interface 402 is configured to traverse a firewall 109 protecting the enterprise's protected network 104. Accordingly, a secure communication channel between the network access server 400 and the protected network 104 can be established via the communication interface 402.

According to an exemplary embodiment, the network access server 400 also includes means for receiving a request to access the protected network 104 via an enterprise computer 200 from the communication interface 402 and managing the log-on process for the computer 200. For example, the network access server 400 can include a network access module 404 communicatively coupled to the communication interface 402 and configured to receive a request to access the protected network 104 via an enterprise computer 200 and to manage the log-on process for the computer 200. In one embodiment, the network access module 404 is coupled to the data store 410 via a data manager 406 that retrieves, submits and updates information stored in the data store 410.

In an exemplary embodiment, the data store 410 includes device information 412, user information 414, and log-on information 416. The device information 412 can include information that can be used to authenticate a communication device 300 associated with an enterprise computer 200. Such authentication information 412 can include a unique identifier associated with each communication device 300, e.g., a phone number, an IP address, a MAC address, a serial number, and the like.

The user information 414 can include information that can be used to authenticate a user 130. In one embodiment, the information 414 can include biometric data associated with each user 130. Such biometric data can include voice data that captures the user's unique voice pattern or voice print. In addition, the voice data can capture an answer to one or more challenge questions. In another embodiment, the information 414 can include access control rules associated with each user 130. In this embodiment, the access control rules can indicate which computer(s) 200 a user 130 is authorized to use.

The log-on information 416 can include information that can be used to log-on to an enterprise computer 200. In one embodiment, the log-on information 416 can include a username/password associated with each enterprise computer 200. In another embodiment, the log-on information 416 can be a username and a randomly generated password that is unknown to the user 130.

In an exemplary embodiment, the network access module 404 is configured to manage the log-on process for an enterprise computer 200 by authenticating the communication device 300 associated with the computer 200, and then authenticating the user 130 by retrieving device and user information 412, 414 from the data store 410. The network access module 404 is configured to use a compare module 408 to compare the retrieved information 412, 414 to the information received from the enterprise 102 via the communication interface 402. Once the communication device 300 and user 130 are authenticated, the network access module 404 is configured to retrieve the log-on information 416 associated with the enterprise computer 200 and to send the log-on information 416 to the computer 200 via the communication interface 402.

In the embodiment shown in FIG. 1, the network access module 404 resides in a standalone server 400 that is located external to the enterprise 102. In this embodiment, the network access server 400 can be controlled by an application service provider ("ASP") that can provide network access control services to more than one enterprise 102. In another embodiment, the network access server 400 can be utilized exclusively by an enterprise 102 to control access to the enterprise's protected network 104. In this embodiment, the network access server 400 can be directly coupled to the protected network 104, i.e., located behind the enterprise's firewall 109.

Figure 5:
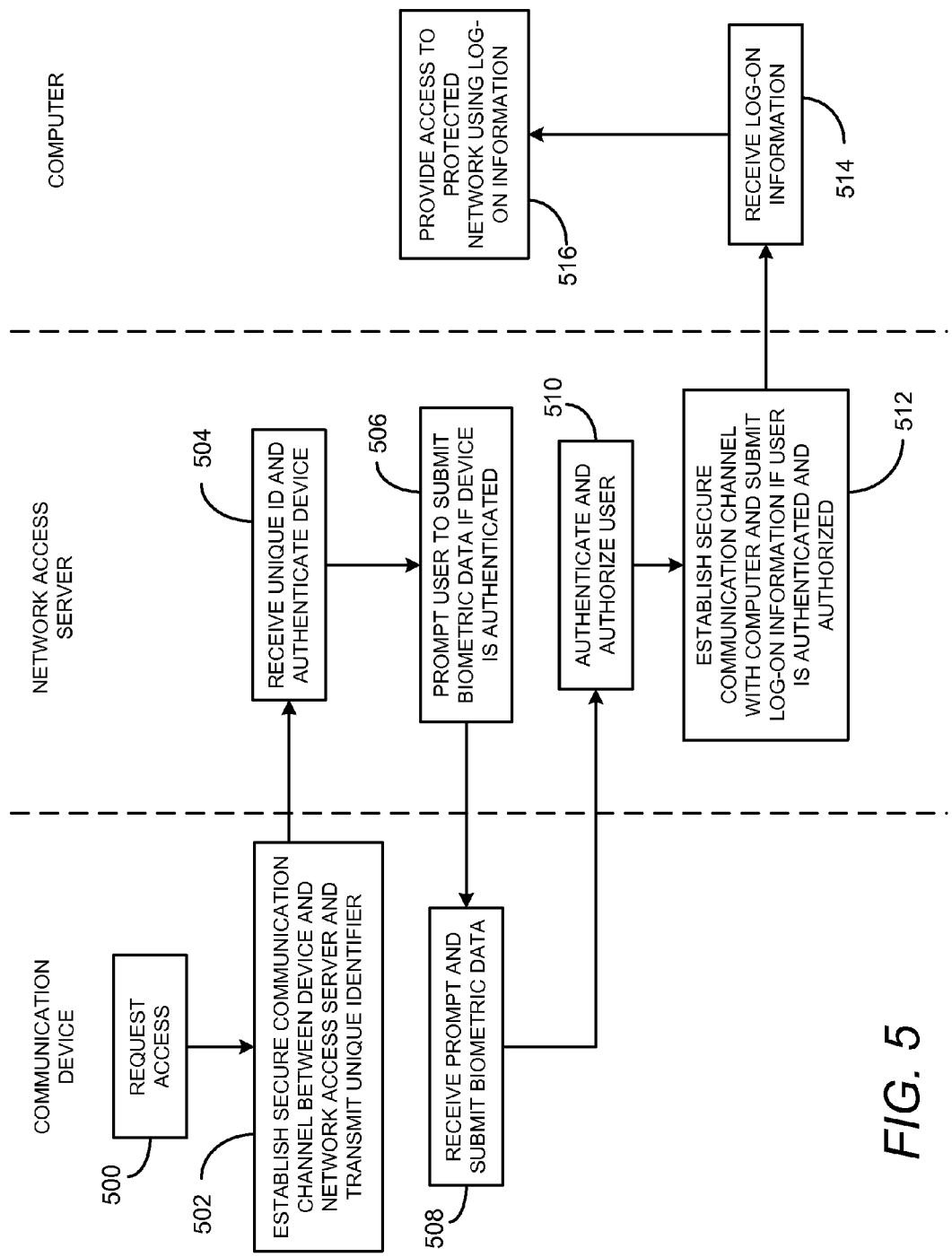
FIG. 5 is a flowchart illustrating an exemplary process for controlling access to a protected network according to one embodiment.

FIG. 5 is a flowchart illustrating an exemplary process for controlling access to a protected network 104 according to one embodiment. Referring to FIGS. 1-4, the process begins when the user 130 requests access to the protected network 104 using the communication device 300 that is associated with the computer 200 coupled to the protected network 104 (block 500). In one embodiment, the user 130 can activate, i.e., press, the dedicated log-on button 310 on the communication device 300 associated with the computer 200. In another embodiment, the user 130 can activate one or more preprogrammed keys in the communication device's keypad 302.

In response to activating the log-on button 310 or preprogrammed key(s), the communication device 300 automatically establishes a secure communication channel between the communication device 300 and the network access server 400 and transmits the unique identifier of the communication device 300 to the network access server 400 (block 502). In one embodiment, the communication device 300 can be a telephone, and the secure communication channel is provided via the internal PBX module 106 and/or the public telephone network 110. In this embodiment, the unique identifier can be the telephone number or IP address of the telephone 300. In addition to, or alternatively, the unique identifier can be a serial number or a MAC address of the telephone 300 or any other identifier that uniquely identifies the device 300.

The unique identifier is received by the network access module 404 at the network access server 400 via the communication interface 402 that is configured to transmit and receive data to and from the telephone network 110 and/or the internal PBX module 106, and the network access module 404 uses the unique identifier to authenticate the communication device 300 (block 504). In one embodiment, the network access module 404 can use the data manager 406 to retrieve device information 412 associated with the enterprise 102 from the data store 410. In one embodiment, the device information 412 can include the unique identifiers associated with each of the communication devices 300 in the enterprise 102. The network access module 404 can then use the compare module 408 to determine whether there is a match between the device information 412 and the received unique identifier. If a match is not found, the network access module 404 can return an error message to the communication device 300 over the established secure communication channel that indicates to the user 130 that the communication device 300 is not registered with the enterprise 102 and access to the network 104 is denied.

If a match is determined, the communication device 300 is authenticated and the network access module 404 transmits a message over the established secure communication channel to the authenticated communication device 300 that prompts the user 130 to submit biometric data (block 506). In one embodiment, the user 130 can be asked to submit voice data using the communication device 300. For example, the user 130 can be prompted to speak his or her name. In addition, or alternatively, the user 130 can be prompted to answer one or more challenge questions, such as his employee number, birthday, address, or place of birth.

When the user 130 receives the message, he can submit the requested biometric data over the established secure communication channel (block 508) using the authenticated communication device 300. For example, if the communication device 300 is a telephone, the user 130 can hear the message and submit voice data through the handset 304.

The network access module 404 receives the biometric data from the user 130 via the established secure communication channel and uses the biometric data to authenticate the user 130 (block 510). In one embodiment, the network access module 404 can retrieve user information 414 from the data store 410. In one embodiment, the user information 414 can include the biometric data associated with authorized users 130 of the enterprise 102. In addition, the biometric data can be processed to determine its content using well known speech to text (STT) technology.

The network access module 404 can then use the compare module 408 to determine whether there is a match between the retrieved user information 414 and the received biometric data. In addition, the network access module 404 can determine whether the content of the biometric data correctly matches the answer to one or more challenge questions. If a match is not found, the network access module 404 can return an error message to the communication device 300 over the established secure communication channel that indicates to the user 130 that an authentication error has occurred and that access to the network 104 is denied.

Alternatively, or in addition, the error message can ask the user 130 to resubmit his biometric data and the access module 404 can try to authenticate the user 130 again. The number of chances allowed to authenticate correctly is configurable. If the user 130 continues to provide the incorrect biometric data, the network access module 404 can deny access and terminate the secure communication channel.

In another embodiment, the user information 414 can also include access control rules that indicate which computers 200 in the enterprise the user 130 is authorized to use. Thus, in addition to authenticating the user 130, the network access module 404 can also determine whether the authenticated user 130 is authorized to use the computer 200 associated with the communication device 300. In this embodiment, when both criteria are satisfied, the network access module 404 can grant access to the network 104.

After the user 130 is authenticated (and optionally authorized), the network access module 404 can establish a secure communication channel between the network access server 400 and the enterprise computer 200 associated with the communication device 300, and transmit log-on information to the computer 200 (block 512). In one embodiment, the network access module 404 can retrieve log-on information 416 associated with the enterprise computer 200 from the data store 410 using the data manager 406. In one embodiment, the log-on information 416 can include the user's username and password. The password can be a randomly generated password or a password created by the user 130. Alternatively, or in addition, the log-on information 416 can include any data used to allow the user 130 to access the protected network 104. In another embodiment, the network access module can be configured to establish the secure communication channel over the internet 120, through the enterprise's firewall 109, and to the enterprise computer 200 via the protected network 104.

The enterprise computer 200 receives the log-on information 416 from the network access server 400 via the communication interface 202 that is configured to send and receive data to and from the protected network 104 (block 514). The communication interface 402 routes the log-on information to the log-on interface 204, which is configured to process the log-on information. In one embodiment, the log-on interface 204 is a modified GINA interface, which is well known in the art. Once the log-on information is properly processed, the enterprise computer 200 can be used to provide access to the protected network 104 (block 516).

In one embodiment, the network access module 404 can be a web service and the network access server 400 can be a web server that securely receives and transmits IP packets over the internet 120. In this embodiment, the log-on interface 204 can be a web-enabled service, i.e., the interface 204 is configured to process data using an internet protocol.

In another embodiment, the log-on interface 204 can serve as a single sign-on service, that is, once the user 130 is authenticated (and optionally authorized), the log-on interface 204 can provide access to other protected resources, e.g., web pages, for which the user 130 is authorized.

Through aspects of the methods and systems described, a user seeking to access a protected network 104 using a computer 200 coupled to the protected network 104 is authenticated using a communication device 300 associated with a computer 200. A network access module 404 is configured to authenticate the communication device 300 and to authenticate the user 130 who submits biometric data via the communication device 300. Once authenticated, the network access module 404 is configured to send log-on information directly to the computer 200 so that the user 130 can access the protected network 104.

In one embodiment, the communication device 300 is a telephone and the biometric data is voice data. Because the telephone 300 can be a standardized device throughout the enterprise 102, the quality of the voice data can be controlled, and voice print authentication can be accurately implemented. Moreover, because the network access module 404 securely provides the log-on information directly to the computer 200, the user 130 is not required to know the log-on information.

Methods and systems for controlling access to a protected network have been described. It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A system for controlling access to a protected network via a computer, the system comprising:
    a network access control module coupled to the protected network, the network access control module configured to restrict access to the network to a user via the computer coupled to the protected network; and
    a communication device associated with the computer, the communication device configured to automatically transmit a unique identifier in response to activation of a dedicated log-on button on said communication device to request access, via the computer, to the protected network, the unique identifier identifying the communication device to the network access control module,
    wherein the network access control module is further configured to authenticate the communication device based on the unique identifier in response to the network access control module receiving the unique identifier,
    wherein said network access control module is further configured to authenticate and authorize the user via the communication device subsequent to authenticating the communication device, and
    wherein said network access control module is further configured to establish a secure communication channel with said computer and subsequently submit log-on information of the user directly to a log-on interface of the computer subsequent to authenticating and authorizing the user, wherein said submitting log-on information to said computer causes said computer to use said log-on information to provide to said user access to said protected network so that the user can use the protected network via the computer.

2. The system of claim 1 further comprising a data store coupled to the network access control module, the data store configured to store information comprising communication device information, user information and log-on information of the computer.

3. The system of claim 2 wherein the data store includes access control rules that indicate whether the user is authorized to use the computer and wherein the network access control module is further configured to verify whether the user is authorized to use the computer associated with the communication device based on the access control rules prior to submitting the log-on information directly to the computer.

4. The system of claim 2 wherein the user information comprises biometric data associated with the user.

5. The system of claim 4 wherein the biometric data associated with the user includes voice data and wherein the network access control module is configured to authenticate the user by prompting the user to provide voice data via the communication device and is configured to subsequently compare the provided voice data to the voice data stored in said data store.

6. The system of claim 1 wherein the communication device is a telephone comprising a keypad for allowing the user to enter a phone number, and wherein the dedicated log-on button is separate from the keypad.

7. The system of claim 1 wherein the communication device is a telephone and the unique identifier is at least one of a phone number, an IP address, a MAC address and a serial number.

8. The system of claim 1 wherein the network access control module is a web service that is configured to communicate with the computer and the communication device over a network.

9. The system of claim 8 wherein the log-on interface is a web-service enabled identification and authentication module.

10. A method for controlling access to a protected network, the method comprising:
   receiving by a network access control module coupled to the protected network a unique identifier from a communication device, said unique identifier corresponding to said communication device, wherein said communication device is associated with a computer, wherein said unique identifier is transmitted by said communication device in response to a user activating a dedicated log-on button on the communication device to request access to the protected network;
   using, by said network access control module, the unique identifier to authenticate the communication device;
   in response to successfully authenticating the communication device, said network access control module authenticating the user via the communication device; and
   in response to successfully authenticating the user, said network access control module establishing a secure communication channel with said computer and subsequently submitting log-on information of the user directly to a log-on interface of the computer, said submitting log-on information to said computer causing said computer to use said log-on information to provide to said user access to said protected network so that the user can use the protected network via the computer.

11. The method of claim 10 further comprising storing information including communication device information, user information and log-on information of the computer in a data store coupled to the network access control module.

12. The method of claim 11 further comprising:
   storing access control rules that indicate whether the user is authorized to use the computer in the data store; and
   verifying whether the user is authorized to use the computer associated with the communication device based on the access control rules prior to submitting the log-on information directly to the computer.

13. The method of claim 11 wherein the user information comprises biometric data associated with the user.

14. The method of claim 13 wherein the biometric data associated with the user includes voice data and wherein authenticating the user includes prompting the user to provide voice data via the communication device, and comparing, by the network access control module, the provided voice data to the stored voice data.

15. The method of claim 10 wherein the communication device is a telephone comprising a keypad for allowing the user to enter a phone number, and wherein the dedicated log-on button is separate from the keypad.

16. The method of claim 10 wherein the communication device is a telephone and receiving the unique identifier includes receiving at least one of a phone number, an IP address, a MAC address and a serial number associated with the communication device.

17. The method of claim 10 wherein the network access control module is a web service that is configured to communicate with the computer and the communication device over a network.

18. A non-transitory computer readable storage medium containing program instructions which when executed perform a method for controlling access to a protected network, the computer readable storage medium comprising program instructions for:
   receiving over a secure communication channel a unique identifier that identifies a communication device associated with a computer when said user uses the communication device to request access to a protected network by activating a dedicated log-on button on the communication device;
   using the unique identifier to authenticate the communication device;
   in response to successfully authenticating the communication device, authenticating the user via the communication device; and
   in response to successfully authenticating the user, establishing a secure communication channel with said computer and subsequently submitting log-on information of the user directly to a log-on interface of the computer, said submitting log-on information to said computer causing said computer to use said log-on information to provide to said user access to said protected network associated with the communication device so that the user can use the protected network via the computer.

19. The non-transitory computer readable storage medium of claim 18 wherein the communication device is a telephone and instructions for receiving the unique identifier includes receiving at least one of a phone number, an IP address, a MAC address and a serial number associated with the communication device.

20. A server for controlling access to a protected network, the server comprising:
   a network access module configured to restrict access to the protected network to a user;
   a data store communicatively coupled to the network access control module for storing information comprising authentication information and log-on information of a computer coupled to a protected network; and
   a communication interface communicatively coupled to the network access control module and configured to receive over a first secure communication channel from a separate communication device a unique identifier that identifies the separate communication device, said communication device associated with the computer, wherein said communication device is configured to transmit said unique identifier in response to a dedicated log-on button on said communication device being activated;

wherein the network access control module is further configured to authenticate the communication device based on the unique identifier in response to receiving the unique identifier;

wherein the network access control module is further configured to authenticate the user via the communication device over the first secure communication channel when the communication device is successfully authenticated; and wherein the network access control module is further configured to establish, in response to authenticating the user, a second secure communication channel and transmit over said second secure communication channel log-on information of the user to a log-on interface of the computer associated with the communication device, said transmitting said log-on information to said log-on interface of the computer causing said computer to use said log-on information to provide to said user access to the protected network so that the user can use the protected network via the computer.

21. The server of claim 20 wherein the communication device is a telephone and the communication interface is configured to receive the unique identifier over a telephone network.

22. The server of claim 20 wherein the server is a web server and the communication interface is configured to send the log-on information to the computer using an internet communication protocol.

23. The server of claim 20 wherein the server is controlled by an application service provider.

24. A computer-implemented method for controlling access to a protected network, the method comprising:

receiving, by a processor, over a secure communication channel a unique identifier that identifies a communication device and that is transmitted by said communication device in response to a log-on button thereon being activated, said communication device associated with a computer;

using, by a processor, the unique identifier to authenticate the communication device;

subsequently authenticating, by a processor, the user via the successfully authenticated communication device;

establishing, by a processor, a secure communication channel with said computer in response to successfully authenticating the user; and subsequently submitting log-on information of the user directly to a log-on interface of the computer, said submitting log-on information to said computer causing said computer to use said log-on information to provide to said user access to said protected network so that the user can use the protected network via the computer.

* * * * *